Patented Sept. 25, 1923.

UNITED STATES PATENT OFFICE.

ARTHUR LÜTTRINGHAUS AND LOUIS BLANGEY, OF MANNHEIM, GERMANY, ASSIGNORS, BY MESNE ASSIGNMENTS, TO BADISCHE ANILIN & SODA FABRIK, OF LUDWIGSHAFEN-AM-RHINE, BAVARIA, GERMANY, A CORPORATION OF THE GRAND DUCHY OF BADEN.

TANNING HIDES.

No Drawing.      Application filed November 8, 1920. Serial No. 422,724.

*To all whom it may concern:*

Be it known that we, ARTHUR LÜTTRINGHAUS and LOUIS BLANGEY, citizens of Germany and the Swiss Republic, respectively, residing at Mannheim, Germany, have invented new and useful Improvements in Tanning Hides, of which the following is a specification.

We have discovered that animal hides, skins and the like can be transformed into leather having good properties by treating them with an acid solution of sulfonated condensation products derived from aromatic hydrocarbons which term should be understood as including also carbazole and carbohydrates. Such condensation products can be obtained for example by condensing aromatic hydrocarbons with sulfuric acid and cellulose, starch, sugar or other carbohydrates. Certain substances of such kind are described in our co-pending application for Letters Patent, Serial Number 422,725, now U. S. Patent 1,412,949. The process of tanning itself may be carried out while employing dilute, or moderately concentrated aqueous solutions of the tanning substances, preferably while maintaining a weakly acid condition. Natural vegetable tanning agents and other proper additions may also be employed at the same time.

A beautiful, strong, fair-colored leather is obtained according to this process.

In order to more fully illustrate the process and the manner of carrying it into effect, the following examples are given to which however the invention is not limited. The parts are by weight.

Example 1.

The hides, delimed and bated, are introduced into a tanning bath, containing in each litre 37.5 grams of a sodium salt of the product resulting from the condensation of naphthalene, cellulose and sulfuric acid, and 37.5 grams of sulfuric acid of 10 per cent. In this bath the hides are allowed to remain until they are thoroughly tanned. After washing, fatting and drying in the usual way a full leather of a beautiful yellowish brown color is obtained. The leather obtained in this way when extracted with diluted aqueous ammonia gives off a compound which, when dry, gives a violet brown to reddish brown coloration with concentrated sulphuric acid and splits off naphthalene when heated in a dry state.

The preparation of the aforementioned condensation product can be done e. g. in the following manner:—

100 parts of cellulose are introduced into 1500 parts of concentrated sulfuric acid, whilst cooling and well stirring. When all is dissolved and a test portion remains clear on diluting with water, 192 parts of naphthalene are added and stirring is continued, while avoiding too high a rise of temperature, until all of the naphthalene is dissolved and naphthalene sulfonic acid cannot be found any longer. Then the mass is poured into water, the solution neutralized by means of milk of lime, filtered and the calcium salt dissolved decomposed by sodium carbonate in the usual manner. On evaporating the filtered solution of the sodium salt a brownish mass is left which is very easily soluble in water.

The employment for tanning can also take place in the following manner. 19 parts of the sodium salt prepared as described and 75 parts of oak wood extract are dissolved in 1000 parts of water and 19 parts of 10 per cent sulfuric acid are added. The delimed hides are placed into this solution until they are thoroughly tanned which result will require much shorter time than if oak wood extract be employed alone. At the same time insoluble parts of the latter will be partly dissolved. After finishing in the usual way a thoroughly tanned leather is obtained which in comparison to that obtained with oak wood extract alone though equally full feels softer and shows a considerably fairer color.

Other condensation products of the defined character may be employed for tanning in an analogous manner. For example, products obtained as described below may be used.

Example 2.

To a solution of 100 parts of cellulose in 1500 parts of monohydratic sulfuric acid 123 parts of benzene are added whilst stirring and preventing the temperature from substantially surpassing 20 degrees centigrade. When all of the benzene has entered the reaction, 600 parts of oleum of 20 per cent $SO_3$ are slowly added whereupon the whole is allowed to stand until a test portion is clearly soluble in water. The product may be worked up as described in example 1.

Other condensation products may be obtained while substituting for naphthalene according to example 1, 240 parts of alpha-chlor-naphthalene, or 344 parts of sodium naphthalene-beta-sulfonate, or 268 parts of powdered anthracene may be used in which case the temperature should not surpass about 50 degrees centigrade and stirring is continued for 96 hours at about from 30 to 40 degrees centigrade. The sodium salt obtained is a dark brown powder, soluble in water with a yellowish brown color. Phenanthrene may be employed in the same manner. If carbazol be used, 130 parts of it may be introduced whilst cooling with ice and maintaining the temperature below 10 degrees centigrade. Continue stirring for about 12 hours, pour the greenish blue mucous mass into ice water, separate the blue precipitate by filtration, wash and dry it and remove unaltered carbazol, if present, by extracting with toluene. The dried residue is added to ten times its weight of fuming sulfuric acid of 23 per cent $SO_3$ whilst stirring, and heated at about 50 degrees centigrade until a test portion is clearly soluble in water. The sulfonic acid is converted into its sodium salt in the above described manner, and the sodium salt can then serve for tanning as set forth.

Similar products of the defined nature which can be employed for tanning in the same way, may be produced as follows: 100 parts of starch, or dextrin, or grape sugar, are intimately mixed with 120 parts of anhydrous sodium sulfate and slowly introduced into 1500 parts of monohydratic sulfuric acid, whilst maintaining a temperature of from 20 to 22 degrees centigrade, and stirring. When all is dissolved, 192 parts of finely ground naphthalene are added and stirring is continued for about 100 hours at from 35 to 40 degrees centigrade. Then the mass is worked up in the described manner.

We claim:—

1. The process of tanning hides which consists in treating the hides with an aqueous solution of a sulfonated condensation product of a carbohydrate and an aromatic hydrocarbon.

2. The process of tanning hides which consists in treating the hides with an aqueous solution of a sulfonated condensation product of a carbohydrate and an aromatic hydrocarbon whilst maintaining a slightly acid condition.

3. The process of tanning hides which consists in treating the hides with an aqueous solution of a sulfonated condensation product of naphthalene and a carbohydrate whilst maintaining a slightly acid reaction.

4. The process of tanning hides which consists in treating the hides with an aqueous solution of a sulfonated condensation product of naphthalene and sugar whilst maintaining a slightly acid solution.

5. The process of tanning hides which consists in treating the hides with an aqueous solution of a sulfonated condensation product of a carbohydrate and an aromatic hydrocarbon and with a natural vegetable tan whilst maintaining a slightly acid condition.

In testimony whereof we have hereunto set our hands.

ARTHUR LÜTTRINGHAUS.
LOUIS BLANGEY.